United States Patent [19]

Mathias et al.

[11] 4,285,718

[45] Aug. 25, 1981

[54] METHOD OF OPERATING TUBULAR HEAT EXCHANGER FOR PREHEATING PULVEROUS GLASS BATCH

[75] Inventors: Richard G. Mathias, Toledo; John D. Novak, Sylvania; Robert R. Rough, Sr., Toledo; Owen M. Small; Sigmund Willinger, both of Toledo, all of Ohio

[73] Assignee: Owens-Illinois, Inc., Toledo, Ohio

[21] Appl. No.: 154,690

[22] Filed: May 30, 1980

[51] Int. Cl.$^3$ ............................................. C03B 3/00
[52] U.S. Cl. .......................................... 65/134; 65/27; 65/335; 165/2; 165/101; 165/103; 165/104.18
[58] Field of Search ........................... 65/27, 134, 335; 165/101, 2, 103, 106

[56] References Cited

U.S. PATENT DOCUMENTS

| | | | |
|---|---|---|---|
| 3,607,190 | 9/1971 | Penberthy | 65/27 X |
| 3,880,639 | 4/1975 | Bodner et al. | 65/134 |
| 4,045,197 | 8/1977 | Tsai et al. | 65/27 |
| 4,113,459 | 9/1978 | Mattmuller | 65/335 X |
| 4,184,861 | 1/1980 | Erickson et al. | 65/134 X |

*Primary Examiner*—Arthur D. Kellogg

*Attorney, Agent, or Firm*—E. J. Holler; M. E. Click; D. H. Wilson

[57] ABSTRACT

The present invention relates to a method for preheating of pulverous materials in a tube heat exchanger prior to their introduction into a melting furnace, with particular application to the delivery by gravity of the vitrifiable starting materials through the heat exchanger to eliminate moisture therefrom prior to introduction of the essentially moisture-free materials into a tank furnace for glass making. The preheating serves to raise the entry-level temperature of the glass batch material and improve furnace fuel efficiency. The preheating involves recirculating at least part of the pulverous glass batch material through the open-ended tubes of the tubular heat exchanger to heat the same and remove moisture therefrom prior to initiating delivery of the glass batch material in preheated condition to the glass melting furnace. The present method is specifically directed at maintaining continuous operation of the preheater upon interruption of material flow through the preheater tubes for any reason. The subject invention, as hereinafter described, is of particular utility to the glass industry, but it is to be understood that it is also applicable to other types of preheaters and furnaces.

6 Claims, 3 Drawing Figures

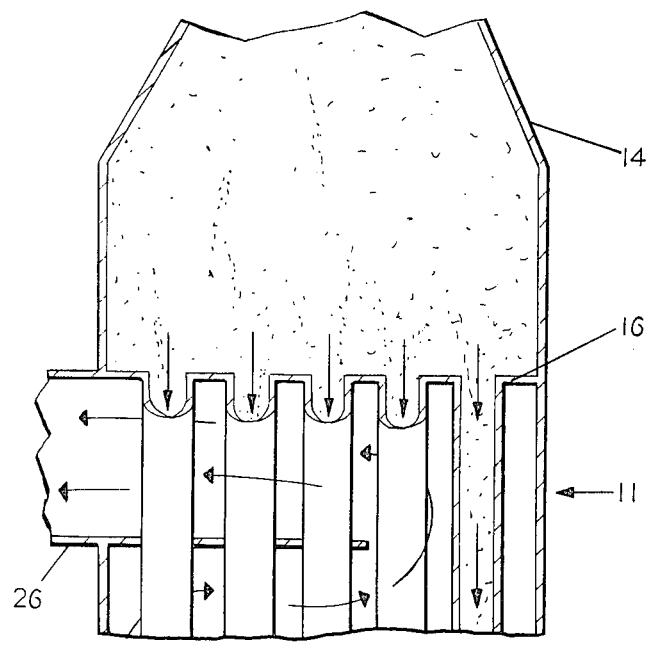
FIG. 2
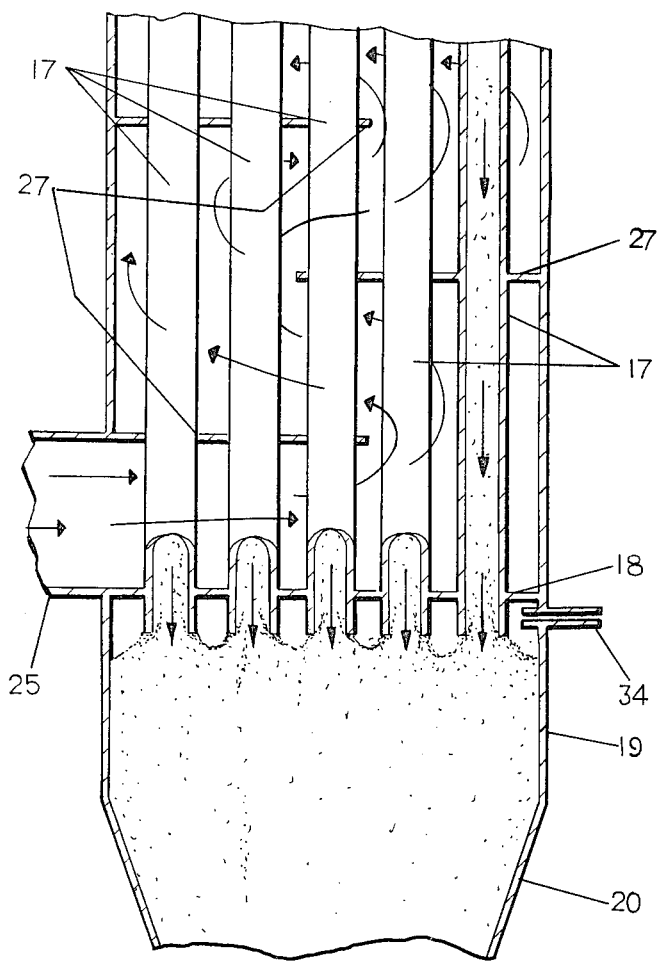

METHOD OF OPERATING TUBULAR HEAT EXCHANGER FOR PREHEATING PULVEROUS GLASS BATCH

CROSS-REFERENCES TO RELATED APPLICATIONS

This invention constitutes an improvement to the invention disclosed in co-pending U.S. patent application entitled, "Method And Apparatus For Preheating Pulverous Materials Prior To Their Introduction Into A Melting Furnace", U.S. Ser. No. 161,091, filed Apr. 11, 1980, filed in the name of Robert R. Rough, and assigned to the same common assignee as the present application. The present invention also is an improvement over a related invention disclosed in co-pending U.S. patent application entitled, "Method Of Initiating Operation of Tubular Heat Exchanger For Preheating Pulverous Glass Batch", U.S. Ser. No. 150,855, filed May 19, 1980, filed in the name of John D. Novak, and assigned to the same common assignee.

BACKGROUND OF THE INVENTION

1. FIELD OF THE INVENTION

Various types of manufacturing processes are known in which the starting materials are introduced into the furnace while cold or at ambient temperature by the use of either continuously or discontinuously operating devices. Such devices are frequently protected by a hydraulic or other cooling apparatus which absorbs the heat from the furnace and additionally intensifies the cooling of the materials introduced into the furnace. In these methods, the starting materials are subjected to heating only after they have been introduced into the furnace where they receive, at high temperature, the quantities of heat necessary for melting them, for ensuring completion of the endothermic reactions, and for imparting thereto sufficient fluidity to ensure homogenization and refining of the resulting molten glass mass. It has been observed in glass making that the greater part of the heat delivered to the starting materials is directed to increasing the temperature of the starting materials rather than to producing the desired endothermic reactions. In most known methods, the starting materials are deposited on top of the molten bath and are subjected to radiation from the flames circulating with great turbulence above them. Since the newly-introduced materials are poor conductors of heat, the heat exchanger is poor, which slows the melting process, thus requiring greater quantities of heat.

The present invention especially relates to increasing the fuel efficiency and output of glass melting installations, and provides means whereby a glass melting furnace may be operated continuously and uniformly at full capacity or beyond, if desired. A method is provided for continuing the preheating of thoroughly-mixed, moisture-containing, glass-forming constituents upon interruption of gravity flow through a tubular heat exchanger before the constituents are supplied to the glass melting furnace. The method preferably utilizes the heat of the waste gases from the melting furnace in such preheating of the glass-forming constituents and effects continuous passage of the glass-forming batch mixture through the preheater by rapidly cooling the preheater tubes when flow is stopped or discontinued for any reason. The method is of special utility whether or not the batch mixture contains cullet.

The invention comprises an improved process to accomplish the aforesaid objects, and in the provision of an improved procedure for maintaining the continuous flow by gravity of the heated glass mixture in a tubular heat exchanger, as more fully set forth in the following specification, and as particularly pointed out in the appended claims.

The provision of the preheater for the glass mixture enables the utilization, for preheating the same, of the heat in the hot waste gases from the melting furnace which otherwise would go to waste up the stack. While the use of hot waste gases is preferred to operate the preheater, preheated air from the furnace heat-recovery "checkers" area which is usually used for combustion, or a supplemental heat source such as an oil or gas burner, alone or in combination, may be used. Also, the provision of the preheater, continuously delivering glass batch mixture at a proper predetermined elevated temperature, to a furnace, which is used with either a continuous or batch process, permits more uniform operation of the furnace with a significant increase in fuel efficiency during operation, and in the out-put of the furnace. The continued operation of a gravity-operated tubular heat exchanger having a plurality of spaced-apart, open-ended tubes, upon stoppage of flow for any reason, is often hampered by pluggage of the tubes. When the particulate material remains stationary in the tubes, a marked change in the coefficient of friction between the particulate material and the tubes occurs, and the material will no longer continue to freely slide by gravity. The present method obviates such difficulties.

2. DESCRIPTION OF PRIOR ART

There is a considerable number of earlier-issued U.S. patents which deal with initially preheating the glass batch mixture prior to its delivery into the glass furnace. U.S. Pat. No. 3,607,170 to Malesak discloses method and apparatus in which the glass batch mixture is preheated in a non-oxidizing atmosphere while being advanced in a given direction through a preheating zone of a tunnel kiln. A mixture of glass powder and foaming agent is delivered into a hopper having a series of tubes through which the mixture passes.

U.S. Pat. No. 3,172,648 to Brichard relates to preheating of pulverous materials in which the flow of the fumes in the preheating zone is in direct contact with the glass forming ingredients, such contact causing an entrainment of dust in the emitting fumes.

U.S. Pat. No. 4,045,197 to Tsai et al relates to apparatus and method for recovering the waste heat from the exhaust gases of a glass melting furnace and transferring the same by heat pipes to an enclosure in which incoming glass batch materials are preheated prior to being fed to a furnace for melting. The heat pipes contain metallic sodium as the working fluid.

U.S. Pat. No. 3,788,832 to Nesbitt et al, and U.S. Pat. No. 3,880,639 to Bodner et al, owned by the same common assignee as the present application, both relate to the preheating of agglomerated glass batch materials by direct contact with a gaseous effluent being exhausted from a glass melting furnace.

U.S. Pat. No. 3,185,554 to Sweo et al relates to a method of preheating glass batch materials by independent heating means other than exhausted effluent so that there is no unpredictable relationship between varying amounts of waste heat and the amount of heat provided for preheating unmelted batch materials.

A considerable number of other U.S. patents relate to the direct heat exchange between incoming batch materials and exhaust gases from a glass melting furnace. These U.S. Pat. Nos. are: 3,607,190—Penberthy, 4,026,691—Lovett, 3,526,492—Motsch, 3,350,312—Peyches, 1,543,770—Hilbert, 3,753,743—Kukuda, 1,610,377—Hitner, and 4,099,953—Rondeaux. Many techniques have been disclosed in the patent literature for direct and indirect heat exchange between hot exhaust gases from a glass melting furnace and incoming glass batch materials. However, none of the listed prior art references relate to a method for maintaining continuous flow of pulverous glass batch materials through a tubular heat exchanger wherein they are preheated during gravity flow through such heat exchanger having open-ended tubes.

BRIEF DESCRIPTION OF THE DRAWINGS

FIG. 2 is an enlarged fragmentary vertical sectional view of the preheater apparatus shown in FIG. 1.

DESCRIPTION OF THE PREFERRED EMBODIMENT

Figure 1:
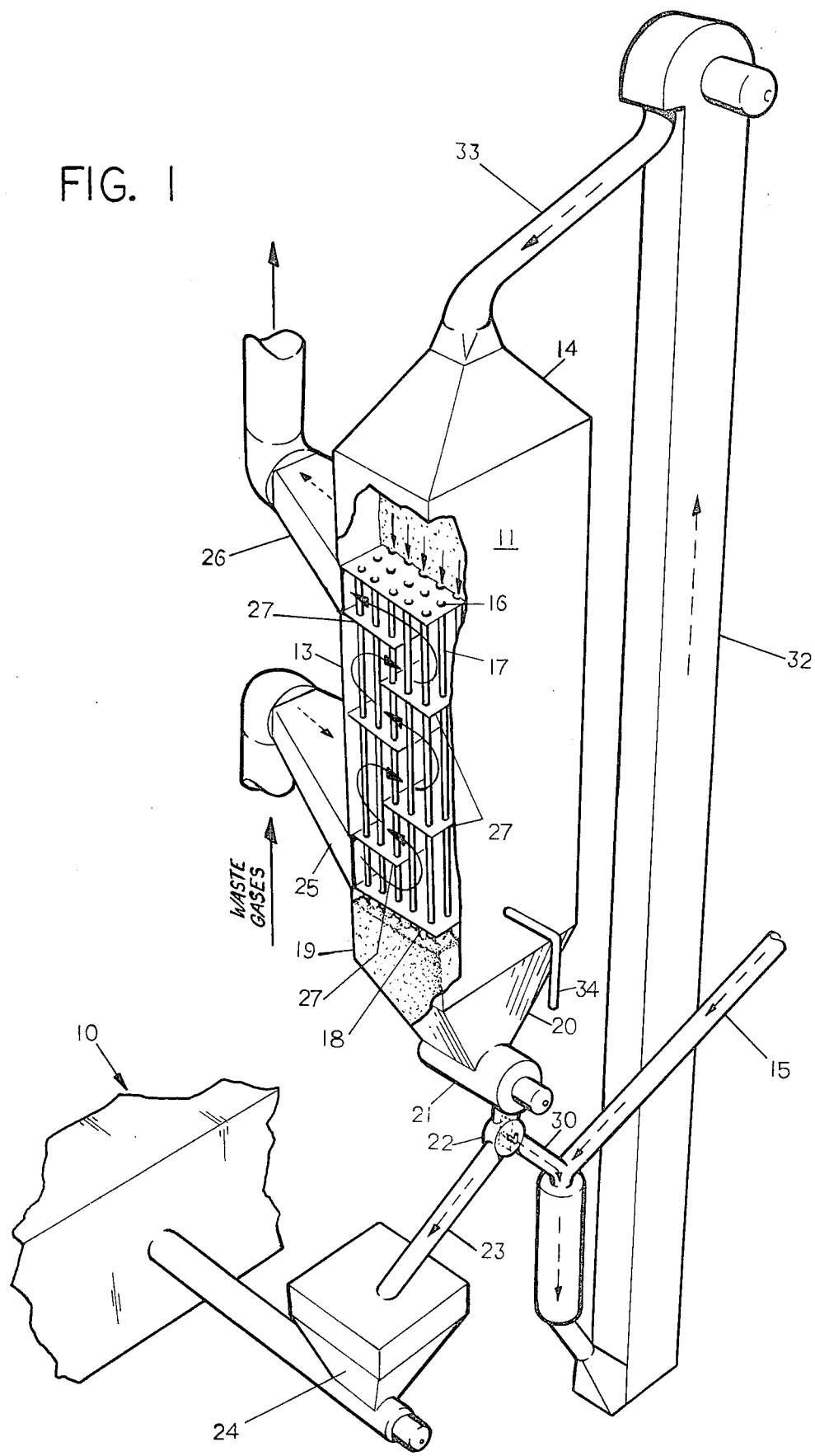
FIG. 1 is a perspective view partially broken away of the glass batch preheater apparatus for practicing the present invention.

Referring to the drawings, a glass melting furnace 10 of the regenerative type having a bottom of fire brick, whereon the melt of glass forming ingredients is deposited, is indicated schematically in FIG. 1. Gas and air are normally mixed and burned in the furnace above the glass forming materials and the resulting heat melts the mixed materials to a mass of molten glass, which is delivered or worked from one end following refining. The regenerative or heat-accumulating chambers or passageways of the furnace are normally located beneath the furnace melting chamber.

The gas and air are usually passed through the regenerative passages beneath the furnace bottom for preheating and through side ports which lead into the furnace melting chamber where they are burned to melt the glass forming materials. The hot waste gases are then passed through opposite side ports and then through the regenerative passages for heat recovery and then to flue ducts and a discharge stack. After a limited period of operation in this manner, the path of travel of the incoming gas and air is switched, by suitable dampers and timers, so that the combustible mixed gases then enter the melting chamber from opposite ports, the hot waste gases then being conducted through opposite flue passages and ducts to the stack. By the alternate use of the regenerative passages for incoming combustion air and outgoing hot waste gases, the incoming combustion air is preheated by the bricks of the regenerative passages which have been heated by the escaping flue gases which previously passed therethrough. All of the foregoing description pertains to well known glass furnace construction and is merely set forth by way of example, although other types of furnaces may also be employed in conjunction with the present invention.

In accordance with the present invention, a preheater 11 is mounted adjacent to the batch feeding end of the glass furnace, which is normally fed by batch chargers 12. The glass forming ingredients in suitably intermixed condition are delivered to the top of the preheater 11 by any suitable means, such as a vertical elevator 32. The vertical elevator may consist of any endless chain or bucket-type arrangement of standard construction, capable of taking the glass forming mixture from a pile or hopper and delivering it into a chute through which it passes into the top of the preheater 11. The glass forming mixture comprises the normal intermixed batch constituents and may or may not contain broken cullet of prescribed size for forming the glass melt. The cullet normally has a size ranging from about ½ to 1 inch U.S. mesh size, and the smaller size being preferred for passage through the tubular preheater to prevent bridging.

The preheater typically comprises a vertical chamber 13 having a rectangular cross-section with a frusto-pyramidal top chamber 14, or a rectangular channel. The main mass of glass batch is delivered through a chute 15 into the bottom area of vertical elevator 32 for delivery to the top chamber of preheater 11. Between the enclosed top chamber and the main body portion of the preheater is located an interior horizontal tube sheet 16 into which a plurality of open-ended tubes 17 are headed at their upper ends. The tubes are mounted in spaced-apart array in parallel, vertical alignment for passage of the glass batch therethrough. The tubes preferably have about a 4 inch internal diameter and extend throughout the central portion of the preheater to an interior, lower, horizontal tube sheet 18 into which they are similarly headed. Thus, the central portion of the preheater comprises a shell and tube arrangement. The number of tubes and dimensions of the preheater will depend upon the size of the glass melting furnace with which it is used, and the desired conditions of use. The tubes are mounted on about 6 to 8 inch centers where 4 inch internal diameter tubes are employed, the corner tubes usually being omitted where the preheater has a rectangular or square horizontal cross-section. The tubes are preferably comprised of carbon or stainless steel for long term use without rusting or corrosion, and are normally equi-spaced for optimum flow of particulate batch therethrough.

The lower region of the preheater comprises a frusto-pyramidal bottom hopper 20 into which the open-ended tubes 17 deliver the heated glass batch. The bottom hopper terminates at its lower extremity into a screw-driven batch removal chamber 21 which interconnects with a diverter valve 22. The diverter valve has a Y-shaped exit portion for directing the major portion of the heated glass batch through a chute 23 to a batch charger 24. The batch charger is capable of delivering the heated glass batch into the furnace 10, after it is properly preheated, through a screw-driven feed member or other means as known in the art.

Immediately above the bottom interior tube sheet 18 of the preheater, an incoming waste gas duct 25 is mounted for delivering hot waste gases into a lower region of the preheater. The duct is designed to open out into a relatively-flat, wide duct inlet having a width comparable to the preheater dimension for introducing the hot gases across its full width.

Immediately below the upper interior tube sheet 16 of the preheater, an outgoing waste gas duct 26 is mounted for removing hot waste gases from an upper region of the preheater. The duct consists of a relatively-flat, wide outlet having a width comparable to the preheater dimension for removing the hot gases across its full width.

A plurality of flat baffle plates 27 is mounted in horizontal, spaced-apart, staggered array within the preheater between the upper and lower interior tube sheets 16 and 18. The baffle plates 27 have openings therein through which the tubes 17 extend between their upper and lower extremities. The baffle plates are able to direct the upwardly-coursing hot waste gases in a circuitous path to provide turbulence to the gases and thereby improve heat transfer to the tubes and indirectly to the glass batch moving downwardly by gravity therewithin. The lower ends of the tubes 17 extend a short distance below lower tube sheet 18 so that the glass batch will fall freely into hopper 20.

The batch mixture passes gradually and continuously through the preheater tubes from top to bottom by gravity. It is then delivered, uniformly heated and well mixed from the bottom hopper region of the preheater to the diverter valve 22 above the glass batch charger 24 of the furnace. The glass batch is thus advanced slowly and continuously downwardly to the furnace area for subsequent melting.

The intermixed glass batch constituents are introduced into the upper hopper area or top chamber of preheater at ambient temperature upon start-up of the apparatus. The batch materials are either conveyed upwardly by elevator 32 or other means to initiate heating of the batch materials during their passage through the tubes 17. All of the batch material initially in the preheater is preferably rapidly and continuously recirculated through the preheater to heat all such material to a temperature above the boiling point temperature of water upon start-up prior to delivery of any of the preheated material to the furnace.

The glass batch in the preheater is indirectly heated by the hot waste gases which are taken from the furnace prior to their arrival at the stack. As shown, the hot gases enter the bottom region of the preheater near the lower end of the tubes 17 and above lower tube sheet 18, the gases then pass in a serpentine path around the staggered baffle plates 27 to the top of the preheater at upper tube sheet 16, then escaping from the preheater through outlet duct 26. Inlet and outlet ducts 25 and 26 may be provided with dampers so that the flow of hot gases through the preheater may be accurately regulated. The gases passing upwardly in cross-flow, moving generally upwardly to the descending glass-forming materials within the tubes, move between and around the tubes heating the same and indirectly the contained glass batch within the tubes. Further, the hottest gases thus act upon the hottest portion of the glass forming constituents at the lower area of the preheater, adding a further increment to its heat immediately before it is directed to the furnace or recycled through the preheater.

In accordance with the present invention, upon continuous operation of the preheater for preheating the batch, the batch charged into the preheater is recirculated through the preheater to maintain the batch in the tubes at a minimal operating temperature. The batch is introduced into the preheater at ambient temperature and a portion recycled through the heat exchanger until all of the pulverous batch material within the tubes is preferably maintained above the boiling point temperature of water. Upon normal operation of the preheater, the heat exchanger is continuously operated to deliver an output portion of preheated material to the furnace batch charger 24 through duct 23.

The water vapor and residual moisture from the batch tends to collect in an upper region of the lower hopper 19 from which it is vented by a vent pipe 34. The residual moisture is driven from the batch materials during their progressive heating and downward travel through the tubes so that the batch falls freely from the tube lower ends extending below the bottom tube sheet 18. It has been found that operating the preheater with its normal volume of batch material being contained therein, and a minor portion of about 25 to 30 percent by weight being recirculated, the entire mass of batch at the top of the preheater will attain a temperature of about 250° F. Continued operation of the preheater with the same proportion of recycled batch results in all of the material within the tubes reaching the minimal preheater operating temperature, i.e., essentially all contained batch material in the tubes being above the boiling point temperature of water.

By proper design of the upper and lower hopper sections of the preheater, such areas preferably having generally frusto-pyramidal shapes, relatively uniform and smooth flow of the batch materials by gravity through the entire vertical height of the tubes of the preheater is attained. Thus, flow rates of the batch through all of the heat exchanger tubes, to maintain the same virtually-full at all times, is obtained for uniform amounts of preheat of the batch. The preferred form of construction for such upper hopper is one having a straight section with a hollow chamber above the tubes, and a wedge-shaped hopper with rounded corners at the bottom at the tube lower ends for continuous movement of the hot, relatively-dry batch. A sufficient head is thereby maintained over the tubes to secure such continuous flow, along with a suitable feeder unit to remove preheated material from the bottom of the hopper.

The batch normally has an 0.1 to 1 percent by weight water content, and when the preheater is operated at normal rates of material throughput, the preheater does not tend to plug by moisture condensation on the cooler material in the upper areas of the preheater tubes. However, if the material is not continuously moved downwardly, the tubes tend to plug, thus preventing or seriously hindering proper preheater operation.

If the preheater is designed to preheat and deliver 15 tons per day of heated batch, for example, with one-third being recycled for maintaining the preheater at a minimum operating temperature, thus totaling 20 tons, the entire mass of batch output is preheated above the boiling point temperature of water having the residual moisture driven out. Such operation involves continuous flow of the material inside the tubes to obtain smooth, uniform, downward movement of the batch.

The diverter valve 22 serves to separate the downwardly flowing stream of glass batch mixture into output and recycle portions once the contained batch material is all suitably preheated. In normal operation, the output portion is delivered into the batch charger 24 through chute 23, after substantially all of the batch material in the preheater is heated above 212° F., while the recycle portion is delivered into chute 30 where it is mixed with incoming cold batch from the supply source to preliminarily heat the latter. The mixed hot and cold batch is then moved downwardly to the bottom of vertical conveyor 32 which serves to elevate the batch and deliver same into the top of the preheater through inlet chute 33.

Through proper proportioning and thorough mixing of the recirculated hot and cold batch fractions, uniform and continuous operation of the preheater apparatus can then be practiced. Such operation can be readily accomplished when the temperature conditions, and the flow of gases and batch material, are properly adjusted. Such uniform operation permits the maintenance of substantially-constant conditions within the preheater for delivering significantly-hotter glass batch to the furnace, greatly increasing the furnace fuel efficiency.

The temperature of the stack gases entering the preheater will vary with furnace conditions, of course; however, they will normally be from 900° F. to 1100° F. for substantial periods. The bases leaving the preheater will range from about 400° F. to 600° F.

Obviously, additional heating means for the preheater may be provided, if desired, although the waste furnace gases are usually fully adequate for most economical operation. The waste gases normally enter the preheater at a temperature of about 900° F. to 1100° F. after leaving the furnace checkers area. As stated, preheated combustion air which has passed through the furnace heat-recovery area can also be used to heat the batch, or a supplemental separate heat source such as a burner may be used.

After preheater recycling operation to raise the batch temperature above 212° F., the glass batch mixture usually enters the top of the preheater at about 250° F. and leaves the preheater at the diverter valve 22 having a temperature ranging from about 900° F. to 1000° F. The foregoing temperatures are attainable with the amount of recirculated batch ranging from about 25 to 30 percent by weight. Such temperatures are possible with a glass furnace which is capable of manufacturing about 240 tons per day of product.

The present invention is intended for use when the continuous flow of glass batch in the tubes is interrupted or discontinued for any reason. When such a condition occurs, the coefficient of friction of the material within the tubes changes abruptly, increasing to the point where the material will not flow by gravity. Such pluggage prevents operation of the preheater and cannot be tolerated at any time for its long-term operation. Upon interruption of material flow in the preheater, the present method permits restarting the downward movement of the batch material, and batch adherance to contacted tube surfaces can be prevented and smooth flow maintained.

In accordance with the present invention, when such flow ceases, the passage of hot gases through the preheater is stopped, a cooling fluid is immediately directed against the exterior surfaces of the preheater tubes. Such coolant is applied as quickly as possible upon stoppage of flow, preferably in the form of ambient air which is drawn into the preheater by suction, or forced therethrough by positive pressure.

Figure 3:
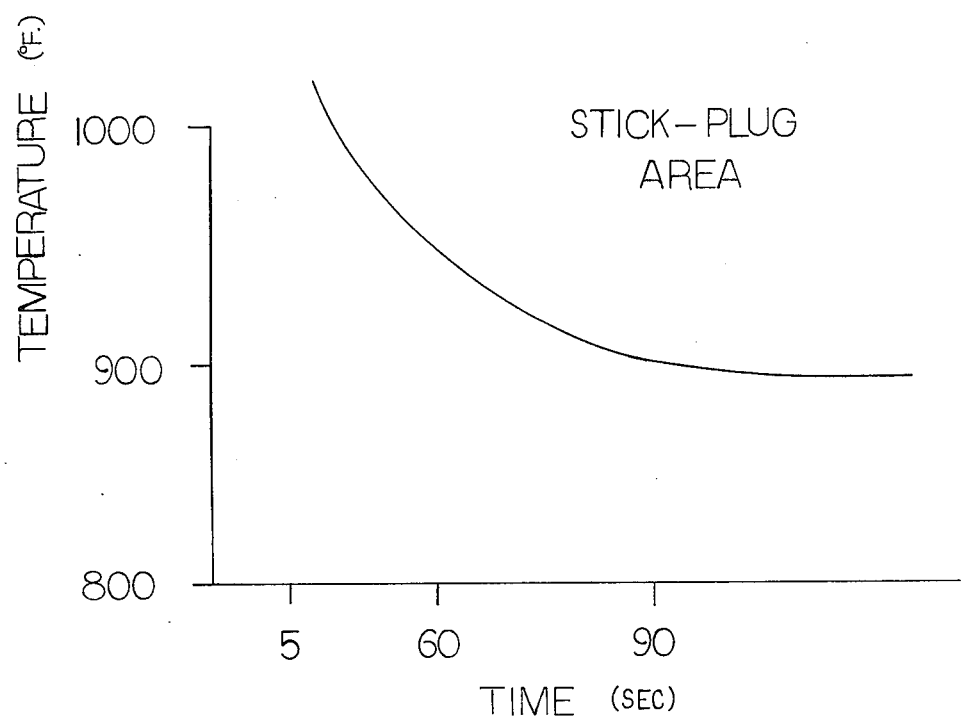
FIG. 3 is time-temperature graph, the curve indicating the sticking-plugging relationship of glass batch within the hot preheater tubes upon stoppage of material flow.

The cooling fluid, preferably a gas such as outside air, is forcefully blown through the preheater in sufficient volume to impinge upon the tube exterior surfaces and rapidly lower their temperature. When the tube surface temperature is about 1000° F., the tubes must be cooled rapidly within about 6 seconds to prevent material sticking in the tubes and plugging same. When the tube surface temperature is about 900° F., the tubes must be cooled within about 90 seconds to prevent such occurrence. The problem of stickage tends to occur not at the tube ends, but in a medial region as the cooling gas loses its cooling effect upon passage into and through the preheater. The avoidance of such stickage is a time-temperature relationship, as shown in FIG. 3, and is based upon the specific design of the preheater.

Various forms of coolant fluid may be used to quickly cool the tubes from their operating temperature to a lower temperature where sticking does not occur. Upon stoppage of material flow, the time-temperature relationship is very sensitive at the batch-tube interface. The batch must be kept moving, otherwise deleterious plugging can and does occur.

The coefficient of friction of the glass batch material within stainless steel or poly-stainless steel tubes is an important factor. The following table indicates the relationship between temperature and the wall friction angle. The latter may be more precisely defined as the kinematic angle of friction between a solid material and a wall.

TABLE I

| Temperature (°F.) | Wall Friction Angle (°) |
|---|---|
| 72° F. | 28° |
| 500° F. | 29° |
| 900° F. | 37° |
| 1200° F. | 32° |

The theory of such temperature-wall friction angle relationship is more fully set forth in the publication, "Storage And Flow Of Solids", by Andrew W. Jenike, Bulletin of the University of Utah, dated November—1964, Volume 53, Number 26.

The present invention is not limited to the interaction of one preheater to one melting furnace, the former being connected with hot gases leading to one stack. If desired, one preheater may be connected to serve a number of melting furnaces, or a number of preheaters may be associated with one furnace and the waste gases emitting therefrom.

Various modifications may be resorted to within the spirit and scope of the appended claims.

We claim:

1. In the process of preheating pulverous moisture-containing material such as glass batch, and the like, within a tubular heat exchanger prior to delivery of such material in preheated, moisture-free condition to a melting furnace, which process includes the steps of allowing the pulverous material to flow downwardly by gravity through a plurality of open-ended tubes of said heat exchanger, passing hot gases through said heat exchanger around said open-ended tubes to heat the pulverous material contained therein by indirect heat transfer, and delivering the preheated pulverous material into the melting furnace, the improvement comprising the step of immediately directing a cooling fluid against the exterior surfaces of the tubes of said heat exchanger upon interruption of flow of said pulverous material through said heat exchanger in order to prevent pluggage of said tubes due to an increased coefficient of friction.

2. In the process of preheating pulverous moisture-containing material in accordance with claim 1, the improvement comprising the step of forcefully delivering a cooling gas against the tube exterior surfaces to rapidly cool the same to prevent tube pluggage by the contained pulverous material.

3. In the process of preheating pulverous, moisture-containing material in accordance with claim 1, the improvement comprising the step of forcefully impinging cooling air against the tube exterior surfaces to rapidly lower their temperature.

4. In the process of preheating pulverous, moisture-containing material in accordance with claim 1, the improvement comprising the step of directing the cooling fluid over substantially all of the tube exterior surfaces which are at an elevated temperature upon such interruption of material flow.

5. In the process of preheating pulverous moisture-containing material such as glass batch, and the like, within a tubular heat exchanger prior to delivery of such material in preheated, moisture-free condition to a melting furnace, which process includes the steps of allowing the pulverous material to flow downwardly by gravity through a plurality of open-ended tubes of said heat exchanger, passing hot gases through said heat exchanger around said open-ended tubes to heat the pulverous material contained therein by indirect heat transfer, and delivering the preheated pulverous material into the melting furnace, the improvement comprising the steps of discontinuing the flow of hot gases through the said heat exchanger to heat the said open-ended tubes, and immediately directing a cooling fluid against the exterior surfaces of said tubes in order to cool the same to prevent pluggage thereof due to an increased coefficient of friction.

6. In the process of preheating pulverous, moisture-containing material in accordance with claim 5, the improvement comprising the step of forcefully delivering a cooling gas against the tube exterior surfaces to rapidly cool the same.

* * * * *